G. SISSON.
METHOD OF PRODUCING MAGNESIUM CARBONATE.
APPLICATION FILED OCT. 28, 1907.
935,418.
Patented Sept. 28, 1909.
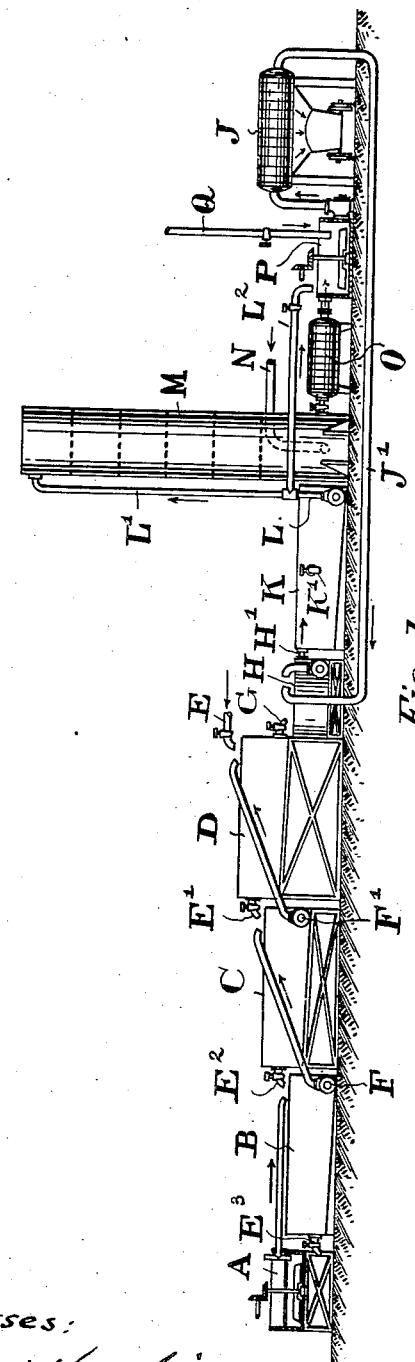
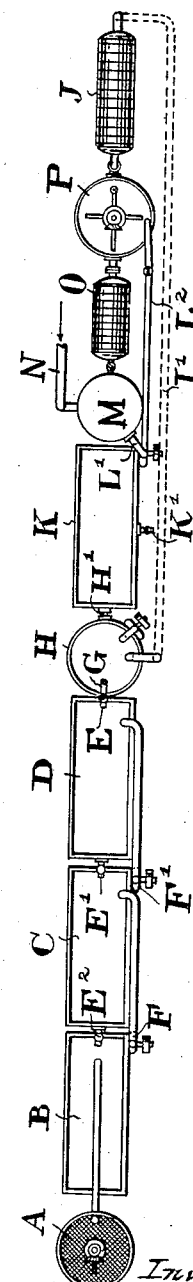
Witnesses:
Inventor:

UNITED STATES PATENT OFFICE.

GEORGE SISSON, OF NEWCASTLE-UPON-TYNE, ENGLAND.

METHOD OF PRODUCING MAGNESIUM CARBONATE.

935,418.  Specification of Letters Patent.  Patented Sept. 28, 1909.

Application filed October 28, 1907. Serial No. 399,489.

*To all whom it may concern:*

Be it known that I, GEORGE SISSON, a subject of the King of Great Britain and Ireland, and a resident of Newcastle-upon-Tyne, England, have invented a new and useful Improved Method of Producing Hydrated Carbonate of Magnesium, of which the following is a specification.

This invention relates to the production of hydrated magnesium carbonate commonly known as and hereinafter referred to as carbonate of magnesium which is especially applicable for industrial purposes, as, for example, for use as a heat insulating covering, and which is cheaply produced in a simple manner.

In carrying this invention into effect I produce the desired carbonate of magnesium by carbonating with or by means of carbon dioxid in the manner hereinafter described a slurry of crude magnesia hydrate which is produced in the known manner by calcining dolomite and slaking it in fresh water, and then treating such calcined and slaked dolomite with sea water until the lime is dissolved and removed as calcium chlorid and replaced by the magnesia precipitated or derived from the sea water.

In the accompanying drawings Figure 1 shows in side elevation and Fig. 2 in plan an arrangement of apparatus which may be used.

A is a tank in which the calcined dolomite is slaked and agitated and from which it overflows into the first settling tank B. C and D are further like settling tanks, C being higher than B, and D higher than C. Fresh sea water is fed to the tank D through pipe E, and the sea water from D can discharge into C through pipe E¹; the sea water from C can discharge into B through pipe E²; and the water from B can be run off to waste through pipe E³. These different pipes are controlled by valves or cocks as desired, and tanks B and C are provided with centrifugal elevators F F¹ by means of which the sedimented slurry can be discharged from B to C and from C to D. The tank B is filled with slaked dolomite from A and with sea water from tank C or which has been otherwise added. After standing for about two or three hours the water from tank B is run off and replaced by water from C and the sedimented slurry from B is raised or transferred to C where it is mixed with and where it is again allowed to settle for about two to three hours in presence of sea water which has been drawn from tank D. Its place in tank B is now taken by a fresh charge of slaked dolomite. The dolomite in C is elevated to tank D where it meets clean sea water, and is replaced by the slaked charge in B which is in turn replaced by a new charge. After settlement in the highest tank D this part of the treatment is completed and the slurry is drawn off for further treatment. In drawing off the slurry from the highest tank it is advantageous to first draw off the water from the tank and transfer it to the tank C. The slurry from tank D discharges through a pipe G into a sludge washer H where it is mixed and agitated with a sufficient quantity of fresh water to dissolve and remove the chlorids. This washing water may be led into the washer from and be the water expressed by filtration of the finally produced carbonate in the filter J. J¹ is the pipe by which such water is led from the filter to the washer H. K is a settling tank for the washed hydrate in communication with H through pipe H¹ and having a waste discharge outlet K¹. The settled washed hydrate is then elevated through a pipe L having two branches L¹ and L². L¹ leads to a carbonating tank M, where, brought to the consistency of milk by water, the hydrate has carbon di-oxid bubbled through it, the carbon dioxid being supplied through a pipe N. The carbonating treatment is continued until the magnesium hydrate is converted into bi-carbonate of magnesium and is dissolved. The solution of bi-carbonate thus obtained is led to a filter press O and after filtration therein for the separation of insoluble impurities is led to a tank P. Into this tank P the branch L² of the pipe L discharges the proper quantity of the hydrate slurry from K. The bi-carbonate solution gives up its excess carbon di-oxid to carbonate the hydrate slurry, precipitating as carbonate itself and carbonating the hydrate slurry so that the whole produce is carbonate of magnesium. This action is facilitated by heat which may be in exhaust steam supplied through the pipe Q. J is the filter press in which the carbonate formed in P is separated. A finer and lighter product is obtained in this manner than would be obtained by treating the magnesium hydrate with carbon di-oxid to only such an extent as to directly produce magnesium carbonate.

The method of treating the dolomite with sea water may of course be varied, and if the situation is convenient the tidal flow of water may be utilized to fill the tanks containing the dolomite.

As an example of the proportions of water and slaked dolomite used in carrying out the above described process the tanks B, C, D may each be formed for the reception of one ton of slaked dolomite and one hundred tons of sea water.

Filtration or like treatment and drying may then take place.

The carbon dioxid for converting the magnesia hydrate into carbonate or bi-carbonate may be obtained from the kiln in which the dolomite is calcined.

The slaked dolomite should preferably lie for some hours before being treated with sea water for the removal of lime.

Carbonate of magnesium produced as above described may have incorporated or mixed with it asbestos or other fibers suitable for the use to which it is to be put. Such admixture of fiber preferably takes place before filter-pressing, but may take place at any other subsequent stage.

For some purposes the dried product may be ground or pulverized.

If desired carbonate produced according to this invention and with or without the admixture of fibrous or other desired material may be molded into suitable blocks.

What I claim is:—

1. The process of producing carbonate of magnesium, consisting in first treating magnesium hydrate with an excess of carbon dioxid until magnesium bi-carbonate is formed and dissolved, then adding further magnesium hydrate to the solution of bi-carbonate to cause the bi-carbonate to give up one-half of the carbon di-oxid contained therein and thereby producing a precipitate of magnesium carbonate, substantially as described.

2. The process of producing carbonate of magnesium, which consists in treating slaked calcined dolomite with sea water until the lime is removed and replaced by magnesia, then treating the resulting slurry with carbon dioxid until it is converted into bi-carbonate and adding the so formed bi-carbonate solution to a sufficient or required quantity of the untreated slurry, substantially as and in the manner described.

3. The process of producing carbonate of magnesium, which consists in calcining dolomite, slaking it with fresh water, treating the slaked dolomite with sea water until the lime is removed and replaced by magnesia, treating the resulting slurry with carbon dioxid obtained from the calcining kiln until it is converted into bi-carbonate, and then adding the so formed bi-carbonate solution to a sufficient or required quantity of the untreated slurry, all substantially as and in the manner hereinbefore described.

In testimony whereof I have signed my name to this specification in the presence of two subscribing witnesses.

GEO. SISSON.

Witnesses:
  JOHN BOWMER,
  NEIL BRODIE.